(12) United States Patent
Davis et al.

(10) Patent No.: US 7,127,713 B2
(45) Date of Patent: Oct. 24, 2006

(54) JAVA APPLICATION FRAMEWORK FOR USE IN A CONTENT DELIVERY NETWORK (CDN)

(75) Inventors: Andrew Thomas Davis, San Francisco, CA (US); Jay Parikh, Redwood City, CA (US); Srinivasan Pichai, Foster City, CA (US); Eddie Ruvinsky, Redwood City, CA (US); Daniel Stodolsky, Somerville, MA (US); Mark Tsimelzon, Sunnyvale, CA (US); William E. Weihl, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 673 days.

(21) Appl. No.: 10/340,206

(22) Filed: Jan. 10, 2003

(65) Prior Publication Data

US 2003/0154239 A1    Aug. 14, 2003

Related U.S. Application Data

(60) Provisional application No. 60/347,481, filed on Jan. 11, 2002.

(51) Int. Cl.
*G06F 9/445* (2006.01)
(52) U.S. Cl. .................................................... 717/177
(58) Field of Classification Search ........ 717/174–178, 717/116, 126, 171, 172, 127; 709/203, 213, 709/232, 318, 217–219, 223–226; 719/313; 705/51; 707/3; 718/102, 105
See application file for complete search history.

(56) References Cited

U.S. PATENT DOCUMENTS

| | | | |
|---|---|---|---|
| 5,991,809 A | 11/1999 | Kriegsman | |
| 6,003,030 A | 12/1999 | Kenner et al. | |
| 6,108,703 A | 8/2000 | Leighton et al. | |
| 6,119,143 A | 9/2000 | Dias et al. | |
| 6,185,598 B1 | 2/2001 | Farber et al. | |
| 6,223,202 B1 * | 4/2001 | Bayeh | 718/102 |
| 6,263,498 B1 | 7/2001 | Alcorn et al. | |
| 6,304,967 B1 * | 10/2001 | Braddy | 713/150 |
| 6,356,941 B1 | 3/2002 | Cohen | |
| 6,405,252 B1 | 6/2002 | Gupta et al. | |
| 6,484,143 B1 | 11/2002 | Swildens et al. | |
| 6,484,214 B1 | 11/2002 | Sundermier | |

(Continued)

*Primary Examiner*—Wei Zhen
*Assistant Examiner*—Anna Deng
(74) *Attorney, Agent, or Firm*—David H. Judson

(57) ABSTRACT

An application deployment model for enterprise applications to enable such applications to be deployed to and executed from a globally distributed computing platform, such as an Internet content delivery network (CDN). According to the invention, application developers separate their Web application into two layers: a highly distributed edge layer and a centralized origin layer. In a representative embodiment, the edge layer supports a servlet container that executes a Web tier, typically the presentation layer of a given Java-based application. Where necessary, the edge layer communicates with code running on an origin server to respond to a given request. In an alternative embodiment, the edge layer supports a more fully-provisioned application server that executes both Web tier (e.g., presentation) and Enterprise tier application (e.g., business logic) components. In either case, the inventive framework enables one or more different applications to be deployed to and executed from the edge server on behalf of one or more respective entities.

17 Claims, 10 Drawing Sheets

U.S. PATENT DOCUMENTS

| | | |
|---|---|---|
| 6,502,125 B1 | 12/2002 | Kenner et al. |
| 6,553,413 B1 | 4/2003 | Leighton et al. |
| 6,665,706 B1 | 12/2003 | Kenner et al. |
| 6,684,387 B1 * | 1/2004 | Acker et al. ................ 717/126 |
| 6,687,702 B1 | 2/2004 | Vaitheeswaran et al. |
| 6,754,659 B1 | 6/2004 | Sarkar et al. |
| 6,754,699 B1 | 6/2004 | Swildens et al. |
| 6,886,170 B1 * | 4/2005 | Bahrs et al. ................ 719/318 |
| 6,922,695 B1 | 7/2005 | Skufca et al. |
| 6,996,616 B1 | 2/2006 | Leighton et al. |
| 7,007,089 B1 | 2/2006 | Freedman |
| 2002/0049603 A1 * | 4/2002 | Mehra et al. .................. 705/1 |
| 2002/0078020 A1 * | 6/2002 | Lawton ......................... 707/1 |
| 2002/0138437 A1 * | 9/2002 | Lewin et al. ................. 705/51 |
| 2002/0174220 A1 | 11/2002 | Johnson |
| 2003/0014554 A1 * | 1/2003 | Williamson et al. ........ 709/313 |
| 2003/0055877 A1 * | 3/2003 | Williams et al. ............ 709/203 |
| 2003/0065810 A1 * | 4/2003 | Ims et al. .................... 709/232 |
| 2003/0097443 A1 * | 5/2003 | Gillett et al. ................ 709/225 |

\* cited by examiner

JAVA APPLICATION FRAMEWORK FOR USE IN A CONTENT DELIVERY NETWORK (CDN)

This application is based on and claims priority from Provisional Application Serial No. 60/347,481, filed Jan. 11, 2002. Portions of this application include subject matter protected by copyright. All rights reserved.

BACKGROUND OF THE INVENTION

1. Technical Field

The present invention relates generally to an application deployment model for use in a content delivery network.

2. Description of the Related Art

Enterprises can expand their business, increase efficiency, and enable new revenue streams by extending their business applications over the Internet to customers, partners, and suppliers. One way to enable enterprises to shift the operational burden of running a reliable and secure Web presence is to outsource that presence, in whole or in part, to a service provider, such as a content delivery network (CDN). A content delivery network is a collection of content servers and associated control mechanisms that offload work from Web site origin servers by delivering content (e.g., Web objects, streaming media, HTML and executable code) on their behalf to end users. Typically, the content servers are located at the "edge" of the Internet. A well-managed CDN achieves this goal by serving some or all of the contents of a site's Web pages, thereby reducing the customer's infrastructure costs while enhancing an end user's browsing experience from the site. In operation, the CDN uses a request routing mechanism to locate a CDN edge server electronically close to the client to serve a request directed to the CDN. Sites that use a CDN benefit from the scalability, superior performance, and availability of the CDN service provider's outsourced infrastructure.

Many enterprises, such as those that outsource their content delivery requirements, also implement their business services as multi-tier (n-tier) applications. In a representative n-tiered application, Web-based technologies are used as an outer (a first or "presentation") tier to interface users to the application, and one or more other tiers comprise middleware that provides the core business logic and/or that integrates the application with existing enterprise information systems. The Java 2 Platform, Enterprise Edition (J2EE™) is a technology and an associated component-based model that reduces the cost and complexity of developing such multi-tier, enterprise services. The J2EE runtime environment defines several types of application components that can be used to build services. These include (a) Web tier components (e.g., servlets, JSP pages, Java beans, filters, and web event listeners), which are components that typically execute in a web server and respond to HTTP requests from web clients, and (b) Enterprise tier components (e.g., session beans, entity beans and message driven beans, which may be developed as Enterprise JavaBeans™ (EJB™)), that include the business logic and that execute in a managed environment to support transactions. Runtime support for J2EE application components are provided by so-called "containers," with a Web container supporting the Web tier components, and an Enterprise container supporting the Enterprise tier components. Containers execute the application components and provide utility services. J2EE-compliant servers provide deployment, management and execution support for conforming application components.

It would be desirable to be able to provide a framework by which such server-side Java applications as well as other Web services could be deployed in a distributed computing environment, such as a content delivery network, to enable application processing on the edge of the Internet.

SUMMARY OF THE INVENTION

It is an object of the present invention to provide an application deployment model for enterprise applications to enable such applications to be deployed to and executed from a globally distributed computing platform, such as an Internet content delivery network (CDN).

It is a more specific object of the invention to provide a framework by which Java-based applications and Web services are deployed onto a distributed computing platform so that enterprises can take advantage of a multi-tier distributed application model.

Another object of the present invention is to provide a deployment model for a content delivery network that enables support for a Java-based Web container or Enterprise container, or both, so that applications or application components can be executed on the edge of the Internet.

A more general object of this invention is to provide a content delivery network with the ability to execute application code on an edge server. Using the present invention, content is created on the edge of the network by running application code.

A specific object of the invention is to provide an edge application deployment model that supports execution of Web tier components, e.g., Java server pages (JSP), servlets and Java beans, on the edge of the Internet close to end users, thus avoiding network latency and the need for costly infrastructure over-provisioning, while improving the performance and reliability of mission-critical enterprise applications.

In a preferred embodiment, the present invention is a CDN Java application framework offering comprising Java-enabled edge servers. This framework takes advantages and leverages the mapping, load-balancing and management systems that are similar to the ones used with known CDN offerings. In a first aspect, the present invention enables the offloading and execution of the presentation or Web tier of n-tier Internet applications. JSP, Servlets, Java beans and custom tags, which are executed within an application server's servlet container, are executed at the edge of the Internet, close to the end-user. In an alternate embodiment, in addition to the Web tier, at least some or all of the Enterprise tier of the application is also deployed to and executed on a given edge server. The Enterprise tier typically comprises middleware such as entity beans, session beans, and message-driven beans that implement the application's business logic and that provide local or remote database support.

According to another aspect of the present invention, developers preferably separate their Web application into two layers: a highly distributed edge layer and a centralized origin layer. In a representative embodiment, the edge layer supports a Web container so that the following technologies are supported: Java server pages (JSPs), servlets, Java beans, Java helper classes, and tag libraries. Preferably, communications between the edge and the origin use conventional communication protocols such as RMI and SOAP. Any protocol that can be tunneled over HTTP, such as JDBC, can also be supported.

Preferably, an application is run on the edge server in its own application server instance in its own Java virtual machine (JVM). In a preferred embodiment, a content delivery network service provider operates a CDN with at least one edge server that includes multiple application server/JVM instances, with each instance associated with a given CDN customer. Resource utilization by the multiple application server instances are monitored, and application server processes that over-utilize given resources (e.g., memory, CPU, disk, and network I/O) are terminated. In addition to resource management, preferably security restrictions are imposed on applications running in each application server/JVM process. This is sometimes referred to as sandboxing. These restrictions include, for example, file system read/write restrictions, limitations on socket opening and usage, restrictions on thread starting, stopping and modification, as well as code restrictions that prevent applications from reading certain application server classes. Preferably, a given application cannot run or load code belonging to other applications, it cannot load data belonging to another application, it cannot read or write arbitrary files on the file system, and it cannot make native kernel calls or load libraries that make native calls.

By providing Web containers at the edge, the present invention provides the ability to off-load up to the entire Web tier of n-tier Internet applications. Web components executed within the application server's servlet container, can be executed at the edge of the Internet, close to the end-user.

In an illustrative operation, an end user makes a request that is directed to a CDN edge server. If the request calls for Java processing and is the first request for the particular application, the application is retrieved from the origin, unpacked, and loaded into the application server. If the application component (e.g., a Web application archive or "WAR" file) is already cached on the edge server, the appropriate servlet or JSP page is used to generate the response. As needed, the edge server contacts the origin site with those portions of the application that need to run on the origin, e.g., access to a central data resource or other non-edgeable servlet. The parts of the page that can best be served from the edge are processed at the edge, while those parts that need to be processed at the origin are processed at the origin, and the results are served back to the end user from the edge server.

Application components are delivered to the edge servers on an as-needed basis. In an alternate embodiment, it is desirable to pre-deploy an application or an application component based on some prediction of expected future need for that application or component, or for purposes of fault tolerance. Thus, a given application or component thereof may be delivered to a particular edge server and initialized and started irrespective of whether an end user request has been received at the server.

The foregoing has outlined some of the more pertinent features of the present invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

The present invention is a Java application framework that leverages Internet CDN architecture and functionality such as generally described below. Familarity with Java programming conventions and the J2EE architecture are presumed. Additional information about J2EE is available in the publication titled Java 2 Platform Enterprise Edition Specification v1.3 (July 2001), which is available from Sun Microsystems. An online copy is available at the following URL: http://java.sun.com/i2ee/j2ee-1_3-fr-spec.pdf.

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
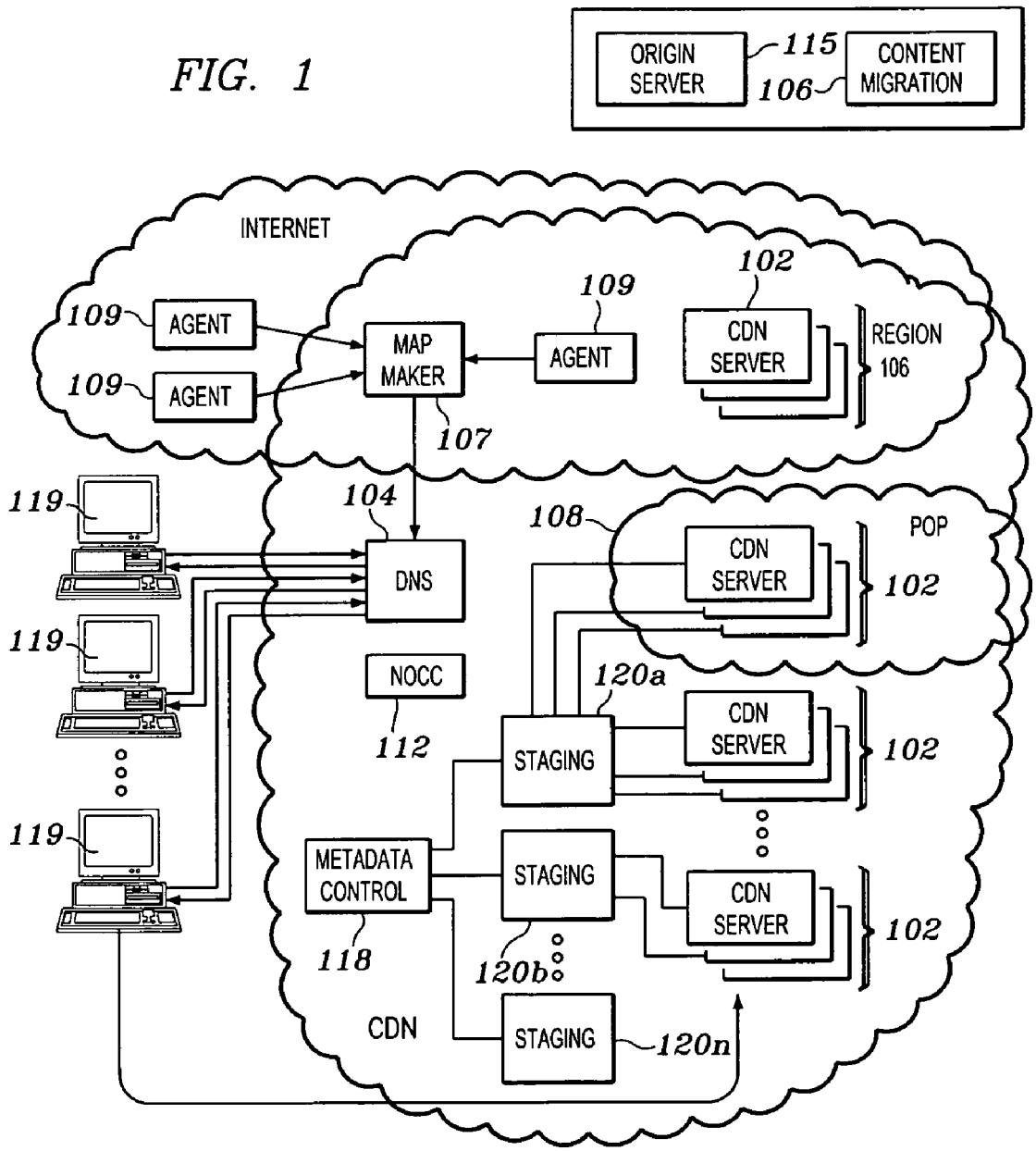
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set of one or more content servers that share a common back-end network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file or HTTP response headers to determine how the object will be handled.

As also seen in FIG. 1, the CDNSP may operate a metadata transmission system 116 comprising a set of one or more servers to enable metadata to be provided to the CDNSP content servers. The system 116 may comprise at least one control server 118, and one or more staging servers 120a–n, each of which is typically an HTTP server (e.g., Apache). Metadata is provided to the control server 118 by the CDNSP or the content provider (e.g., using a secure extranet application) and periodically delivered to the staging servers 120a–n. The staging servers deliver the metadata to the CDN content servers as necessary.

Figure 2:
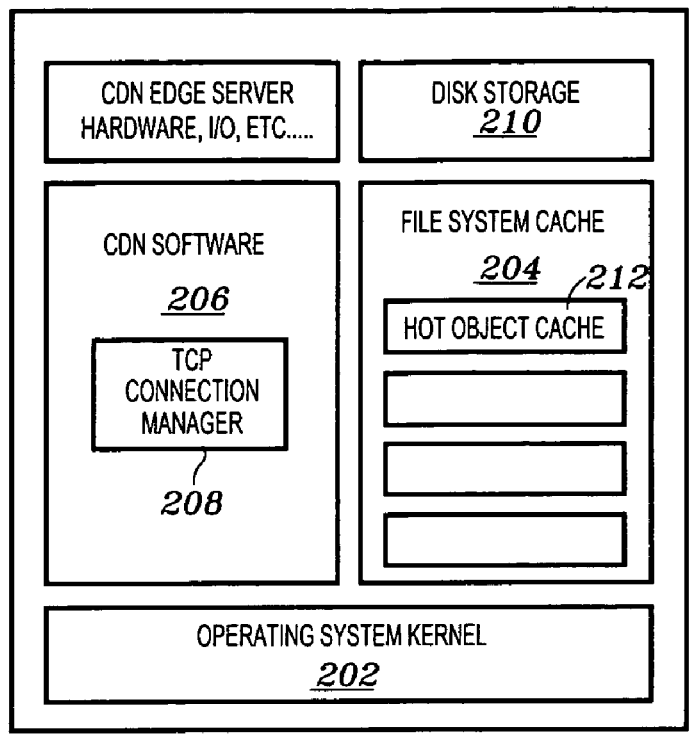
FIG. 2 illustrates a typical machine configuration for a CDN edge server.

FIG. 2 illustrates a typical machine configuration for a CDN content edge server. Typically, the content server 200 is a caching appliance running an operating system kernel 202, a file system cache 204, server manager software 206, TCP connection manager 208, and disk storage 210. Server manager software 206, among other things, creates and manages a "hot" object cache 212 for popular objects being served by the CDN. It may also provide other CDN-related functions, such as request routing, in-region load balancing, and the like. In operation as an HTTP cache for example, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss. Typically, the edge server operates in a "pull" manner, wherein an object is pulled into the cache initially upon the first request to the cache—which will generate a cache miss since the object is not present.

The present invention is a CDN Java application framework offering comprising Java-enabled edge servers. A given edge server (the machine) such as illustrated above in FIG. 2 is assumed to include application server code. As is well-known, an application server is a software platform (sometimes called middleware) on which applications can be deployed. It provides useful utility services and functions to applications. There are currently several major types of application servers, Java-based (J2EE) and Microsoft .NET. Java, of course, is a programming language and a platform, and the programming language is object-oriented and platform independent. Applications written in Java are translated into Java byte code, which code is then run on (intepreted by) a Java Virtual Machine (JVM). In a preferred embodiment of the invention, given edge servers in the CDN are provisioned with a Java application server and additional code to enable Java applications or application components to be executed from the edge of the Internet. The framework can take advantage of and leverage the mapping, load-balancing and management systems used with known CDN offerings, such as the CDN illustrated in FIG. 1 (which is merely representative). In a first embodiment, the application server is a servlet container (e.g., Apache Tomcat), in which case the present invention enables the offloading and execution of the Web tier of n-tier Java-based applications. JSP, servlets, Java beans and custom tags, which are executed within an application server's servlet container, are executed at the edge of the Internet, close to the end-user. The Web tier is typically the front end of a J2EE server. In an alternate embodiment, in addition to the Web tier, at least some or all of the Enterprise tier of the application is also deployed to and executed on a given edge server. The Enterprise or "business" tier typically hosts application-specific business logic and provides system-level services such as transaction management, concurrency control, and security.

Figure 3:
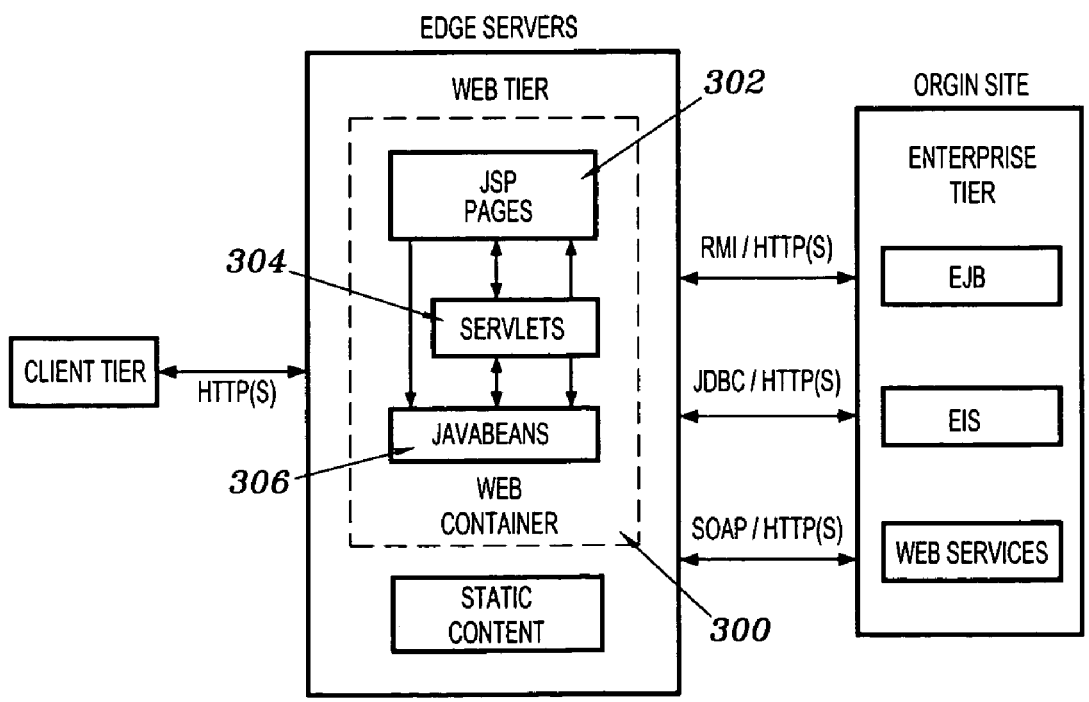
FIG. 3 illustrates a first embodiment of the present invention wherein a Web tier is implemented in an edge server.

The present invention advantageously enables a J2EE-compliant application to run in an edge-origin server environment. In particular, the inventive framework preferably leverages a distributed computing platform by distributing the application across the origin and the CDN. As noted above, typically the application contains servlets, JSPs, filters, tag libraries and Java beans/helper classes in a Web tier, and enterprise beans in an enterprise tier. Separation of the Web tier from the Enterprise tier, with execution of the Web tier (e.g., in a Web container) on the edge servers and the Enterprise tier (e.g., in an Enterprise container) on the origin site, is illustrated in FIG. 3. In this embodiment, the edge-enabled version of the application typically comprises two cooperating applications: an edge-side application and an origin-side application. Components of the Web tier may be packaged as a Web Archive (WAR), and components of the Enterprise tier may be packaged as an Enterprise Archive (EAR). As described above, the creation of these two applications typically requires decisions based on knowledge of the application, namely, decisions about which processes should run on the origin and which at the edge.

Figure 4:
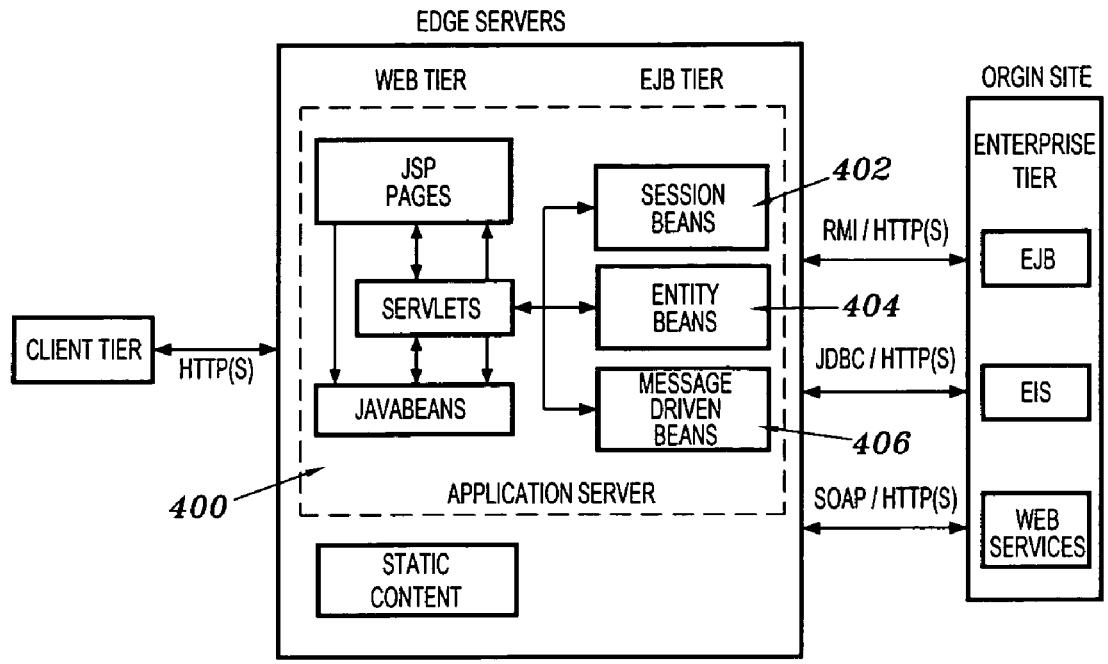
FIG. 4 illustrates a second embodiment of the present invention wherein a Web tier and an Enterprise tier are implemented in the edge server.

The inventive framework is not limited to running the Enterprise tier in an Enterprise container on the origin, however. As illustrated in FIG. 4, the Enterprise tier may also be distributed out to the edge servers and executed with the Web tier in an application server 400. In this embodiment, the Enterprise tier (for illustrative purposes only) comprises one or more Enterprise JavaBeans (EJB) elements as session beans 402, entity beans 404 and message driven beans 406. To support the Enterprise tier, session beans preferably are persisted into globally coherent state. Entity beans can be used to replicate (at the edge server) read-only databases and to provide transparent tunneling (e.g., using JDBC over SOAP) to an enterprise database.

In a representative embodiment, an application server is IBM WebSphere 5.0 application server (WAS). IBM WebSphere uses JVM (Java Virtual Machine) 1.3.1, available from IBM. In FIG. 3, in contrast, the Web tier is executed in a Web container 300. In this example, the Web tier comprises such elements as JSP pages 302, servlets 304 and JavaBeans 306. A representative Web container is provided by Apache Tomcat servlet container, which uses the JVM in JDK 1.3.1_04 available from Sun Microsystems. Of course, these components are merely exemplary and are not meant to be limiting. Preferably, a Web or Enterprise container runs in multiple instances on CDN edge servers, preferably under application isolation as will be described.

In particular, preferably each application is run in an isolated environment via a sandboxing mechanism implemented, e.g., in the JVM. Generally, sandboxing is accomplished by monitoring the resource (e.g., CPU, memory, disk, network I/O) utilization of each application server process. If an application server process over-utilizes resources, it is terminated, and a new application server is started. If an application server induces multiple restarts dues to excessive resource utilization, it is blocked from causing another restart. Preferably, a separate application server process is used for each CDN customer, as this prevents one customer's application from stealing resources from another customer's application. It also isolates application server restarts. In addition, each application server process preferably is run within its own sandboxed directory, outside of which it cannot read or write files. This prevents one customer's application from interfering with another customer's application, or one customer's application accessing another customer's data. Additional details regarding resource management and sandboxing are set forth below.

Figure 5:
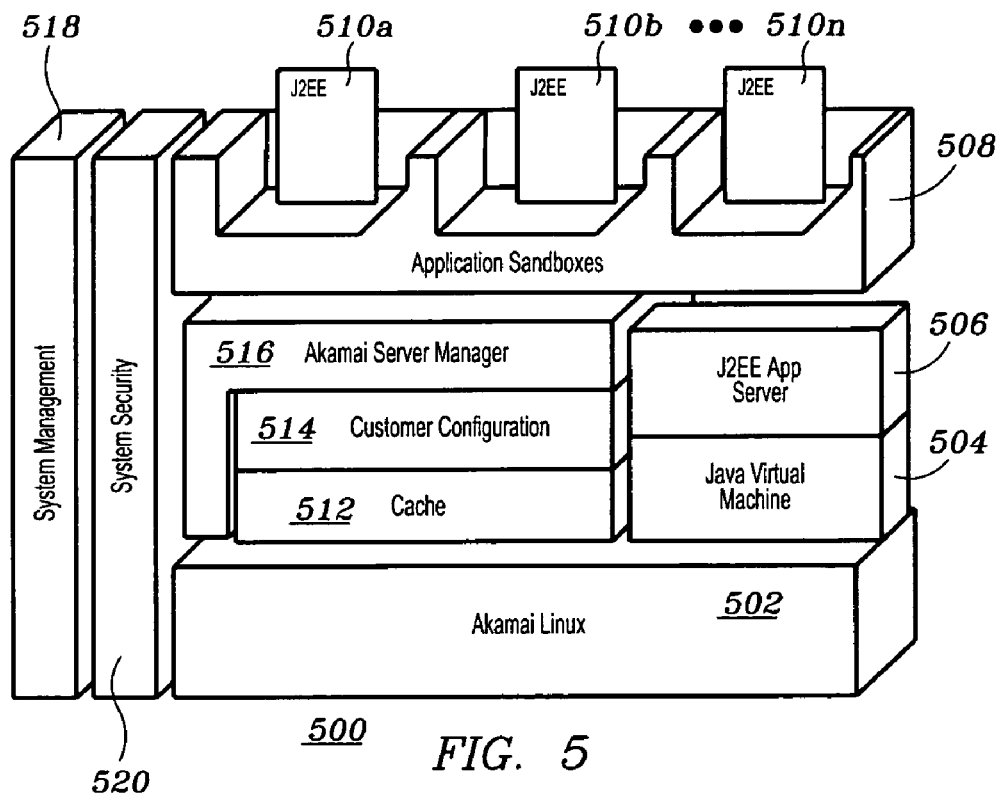
FIG. 5 illustrates a representative edge server of the present invention for use in executing one or more edge-enabled applications.

FIG. 5 illustrates an edge server architecture. The server 500 preferably runs on commodity hardware running an operating system (e.g., a modified form of Linux) 502. The Java stack includes a Java Virtual Machine (JVM) 504 and preferably a J2EE-compliant application server 506. For Web tier components (such as illustrated in FIG. 3), the application server 506 may be implemented with Apache Tomcat servlet container as noted above. For Web tier and Enterprise tier components (such as illustrated in FIG. 4), the application server 506 may be implemented with IBM WebSphere Application Server (WAS). These products, of course, are merely exemplary. According to the invention, the framework (preferably the JVM) creates and maintains application sandboxes 508 for each of the applications 510a–n. A given customer may run application 510a, while another customer runs application 510b. Generalizing, the edge server 500 supports multiple discretely-executable applications. The edge server 500 implements a cache 512 and maintains customer configuration data 514 that controls when application components are used. The server manager 516 overlays and controls the cache, using the customer configuration data. Application sandboxing prevents applications from hurting each other, the server, or gaining access to the code and data of other customers. As noted above, sandboxing also facilitates resource allocation to enable the server to monitor and control the use of CPU, RAM, disk, bandwidth and the kernel. System management 518 and system security 520 modules are also provided to facilitate these and other functions.

Figure 6:
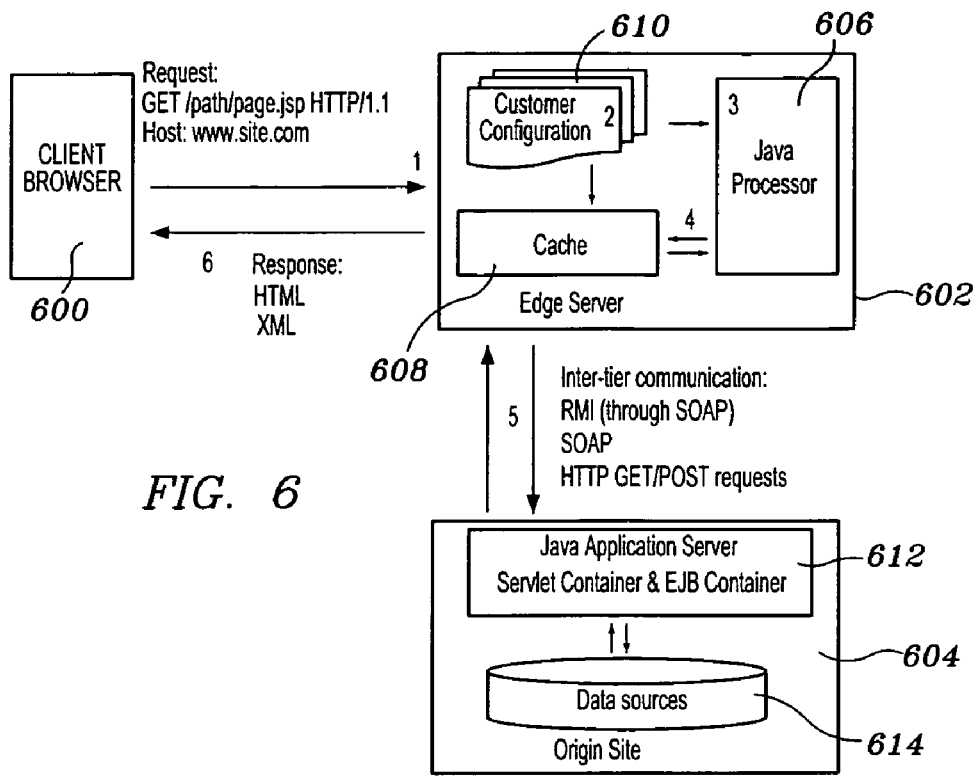
FIG. 6 illustrates a common request/response data flow for an edge-enabled application according to the present invention.

FIG. 6 illustrates how an end user client browser 600 interacts with a content delivery network edge server 602 and an origin site 604 to facilitate execution of the application (and, in particular, its Web tier components) on the edge of the network. In this example, it is assumed that the Web tier components of the application are available for deployment and execution on the edge server. As described above, the edge server 602 has a Java processor 606, a cache 608, and a set of customer configuration data 610. The origin site 604 executes a Java application server 612 and includes data sources 614. To utilize the platform, an enterprise creates a DNS alias (e.g., a canonical name or CNAME) that points their Internet domain name to the Internet CDN service provider. Consequently, any lookup for the customer's domain name (e.g., www.site.com) results in a lookup for the IP address of an aliased domain. Because the CDNSP's DNS is responsible for resolving these queries, the CDNSP returns the IP address of an optimal edge server, in this example edge server 602. This is step (1). The decision about which server to resolve the user to typically is based on network congestion, network proximity, server load and bandwidth utilization. At step (2), the edge server 602 applies the customer's configuration data 610 to the request, determining if the request should be serviced using the edge server's local cache 608 or Java processor 606, or forwarded (e.g., via tunneling) to the customer's origin server 604. Thus, when the edge server receives a request from a client, preferably it first matches the request with an appropriate customer configuration file. If the customer configuration file associates Java processing with the request, the Java processor 606 is engaged. If the request is for a servlet or a JSP page, the Java processor 606 fulfills the request. This is step (3). In particular, when a request is received from an application whose WAR file is already in the edge server 602, the Java processor 606 uses the applicable servlet or JSP page (for example) to generate a response for the incoming request. A standard deployment descriptor (e.g., web.xml) may be used to properly map the request(s) to a servlet. If this is the first request that uses this particular web application, the application components (e.g., a WAR file) are retrieved from the origin site or a CDN staging area. As an optimization, the first request can be tunneled to the origin site for processing, while the edge server asynchronously retrieves the WAR file to handle future requests. If the servlet requires a data resource, it may obtain that resource from cache 608. This is step (4). Alternatively, if the servlet is forwarding a request to another (possibly non-edgeable) servlet, the Java processor 606 on the edge server contacts the origin site. As indicated in step (5), communication between the edge server and the origin server is through RMI, SOAP or explicitly through HTTP. RMI enables an edge application to use a remote object as if it was local. SOAP provides an XML-based RPC mechanism for communicating with remote objects. Alternatively, a servlet may retrieve data through an HTTP request in any other format. Preferably, the CDN service provider provides classes that can be used to query XML data. The retrieved data may also be cached in cache 608, eliminating inter-tier latency for future requests. As indicated at step (6), the edge server 602 completes the processing of the request and returns the response to the client. Preferably, the executed servlet remains in memory, ready for a request from a next user that is mapped to the edge server.

Figure 7:
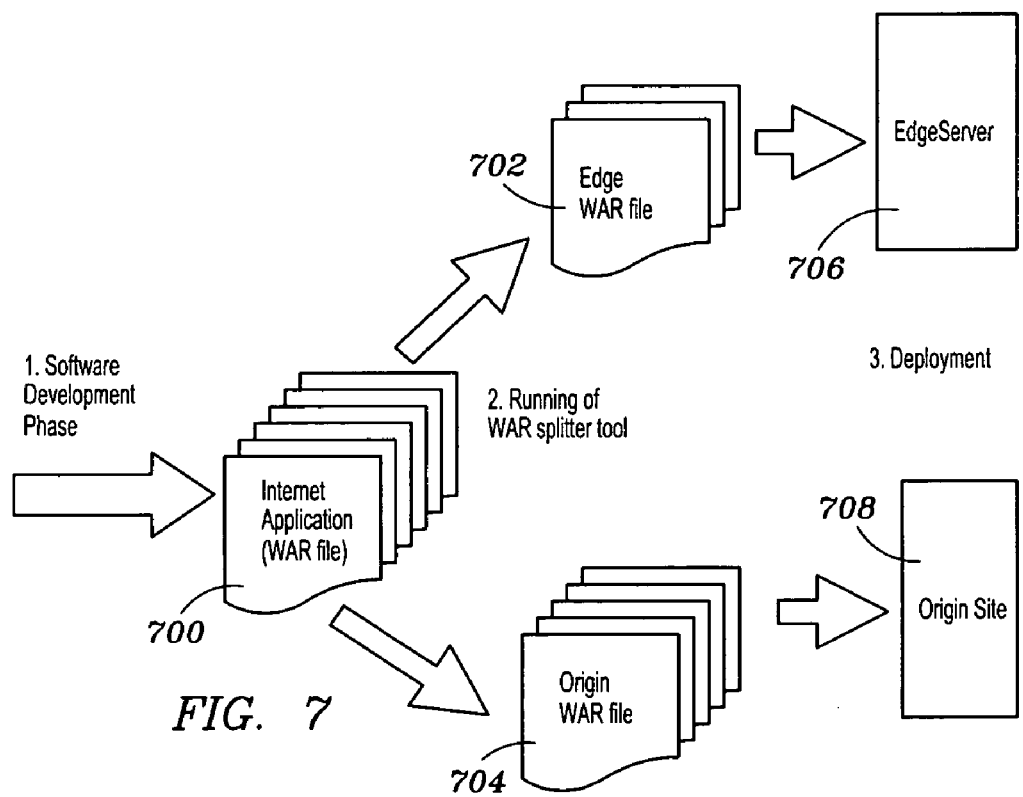
FIG. 7 illustrates one technique for developing an edge application for use in the present invention.

FIG. 7 illustrates one way in which an application can be developed and deployed to facilitate edge processing. An application (or component thereof) that is designed for execution on an edge server of a content delivery network is sometimes referred to as an "edge-enabled" application. As illustrated in FIG. 7, after an application 700 has been developed through a software development phase, it may be split into two parts, e.g., by running a splitter or other code development tool, producing, for example, an edge WAR file 702 and an origin WAR file 704. In an illustrative embodiment, the edgeable components 702 are then prepared for deployment on the CDN edge server(s) 706, while the full application is prepared for deployment on the origin site 708. Any convenient technique to allows the developer to specify which components are edgeable, and which are dependent on the centralized resources, can be used with this invention. Preferably, the application developer creates the application using n-tier design principles. Of course, the application development process need not include creation of a single, original WAR file, as the edge and origin components can be designed and built separately in the first instance.

The following are some additional guidelines for edge-enabling an application for the framework in an embodiment in which just the Web tier is located on the edge. In this embodiment, enterprise beans run at the origin, and calls to the enterprise beans (including use of home or remote interfaces) preferably do not exist in edge-located filters, servlets, helper classes or beans. Preferably, direct calls to origin-based system resources, such as a database, do not exist in edge-located servlets, helpers or beans. In such case, however, database connectivity is provided, preferably using a Type 3 JDBC driver. Also, any filters, servlets or JSPs that require servlet context preferably do not access the ServletContext of a different web application. In this embodiment, Web applications can use ServletContext attributes to store state. For security reasons, certain web components may need to run at the origin. The web application preferably adheres to the "distributable" conventions described in Servlet Specification 2.3, including marking the web application as "distributable" in its deployment descriptor. Web components in an execution sequence followed in response to a request preferably run entirely at the origin or entirely at the edge in response to this request. A web application edge component that uses request dispatching (include/forward) preferably can only dispatch to another edge web application component; the same is true for an origin component. However, the source or target (dispatched) edge component is free to contact the origin to send data, retrieve data, or the like.

An execution sequence normally consists of filters, servlets and JSPs that are involved in response to a request, but preferably it does not include external resources that are used via connections to the origin (such as HttpURLConnection). Preferably, the same request and response argument are shared by the filters that are executed, and by servlets and JSPs that include or forward to each other to form the execution sequence. The definition is dynamic, because a servlet could be included in edge-side and origin-side execution sequences without contradiction.

With knowledge of the legal execution requests in the application and the set of requests that cause these execution sequences to be followed, a developer can edge-enable the application. In one embodiment, this process involves identifying components as origin-only, edge-only or both. Origin-only components can run on the origin, preferably unchanged. Edge-only components run only at the edge. The both designation applies to a servlet that could be on an execution path to an origin-only servlet and also on an execution path in which all servlets are edgeable. In this case, the servlet needs to be installed at the origin as well as the edge. The both category might also apply to a servlet serving a comparable function at the edge and at the origin. Some components may best be split into edge and origin components.

To construct the request sets and corresponding execution sequences, the deployment descriptor (web.xml) can be used to obtain servlet-mapping values and URL-patterns corresponding to them. For those components that should be split into edge and origin components, it is desirable to create an edge-side component of the same type and one or more origin-side servlets. This can be done by factoring out the origin-side functionality to create the edge-side component and using servlet facades for the origin-side system calls. Components needed both at the edge and at the origin are marked both, and the remaining components are marked edge.

An edge dispatcher is then constructed. An edge dispatcher is a single entry point into the web component at the edge. This dispatcher servlet examines an input request and decides to proxy it to the origin or to forward it to a servlet/JSP on the edge. If the pre-edge-enabled web component (i.e., without the dispatcher) already has a single entry point, then the dispatcher functionality can be built into this entry point itself. To construct this component, consider each request set and its corresponding execution sequence. If the execution sequence includes a component marked origin-only, then the corresponding request set must be proxied to the origin (and the filters at the edge must be configured to ignore these requests). Otherwise, the request can be satisfied at the edge and the edge dispatcher forwards it to the first edge-side servlet or JSP in the execution sequence.

In addition, to edge-enable the application, some deployment information in the web.xml deployment descriptor must be altered, in particular the servlet-mapping and filter-mapping values to make sure that all requests are routed through the edge dispatcher. Also, filters preferably are not applied twice (e.g., first at the edge, and then at the origin) on requests that are proxied to the origin. Alternatively, one could set up edge-filters and origin-filters. The webapp must adhere to the "distributable" conventions described in Servlet Specification 2.3, including the fact that it must also be marked as "distributable" in its deployment descriptor. The deployment information in the deployment descriptor is altered (particularly the servlet-mapping and filter-mapping values) to make sure that all requests that routed through the edge dispatcher, and that filters are appropriately applied.

Figure 8:
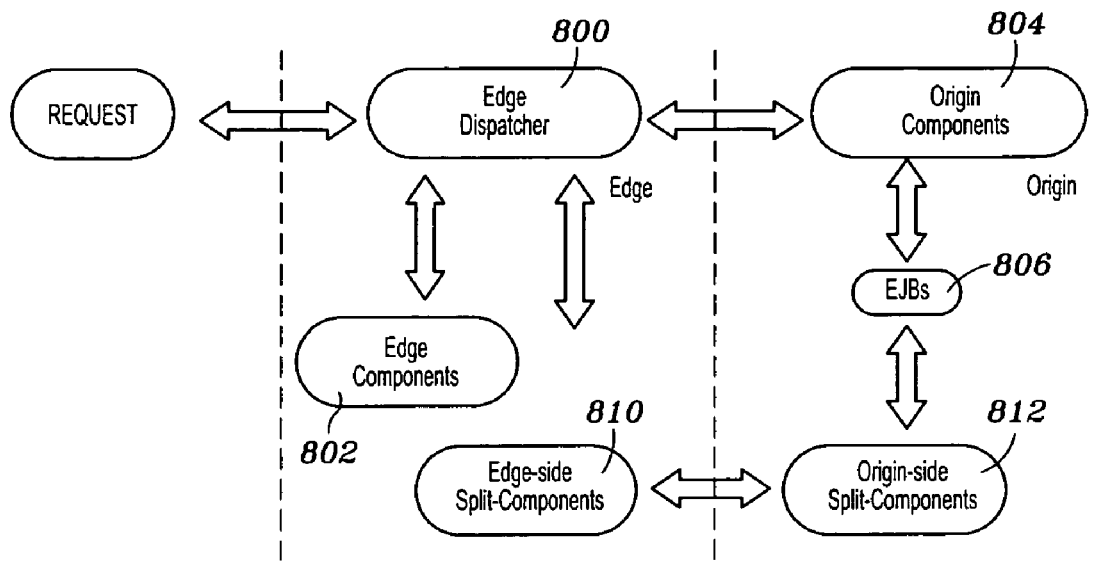
FIG. 8 is an illustrative communication data flow when an edge server dispatcher component receives a client request.

Typically, the edge dispatcher receives the request and determines its handling. As illustrated in FIG. 8, which is merely exemplary, the request may be processed entirely at the edge by the edge components 802. Alternatively, the dispatcher 800 may serve as a proxy and send the request to the origin 804, which might in turn call origin processes such as enterprise beans 806, which return the response to the proxy which in turn responds to the client. In a split scenario, the dispatcher 800 sends the request to the edge-side component 810. The edge component 810 communicates with the origin-side split component 812, which in turn may call origin processes such as the beans 806. The response return via the edge side component 810.

In the above approach, a servlet/JSP on the edge (the proxy) marshals arguments and sends them to a servlet at the origin (the broker), which parses the arguments and performs the requisite method invocation. Then, the broker marshals the return value and sends it back to the proxy. The broker exports origin-side functionality to the edge and serves as a facade for this functionality. In particular, any communication between an edge servlet/JSP and an enterprise bean is preferably via a servlet facade at the origin. An alternative to the design is to have a single origin-side servlet that mediates between the edge and all serlet facades at the origin. This provides a single entry point for edge-origin requests. An origin dispatcher could itself provide all the functionality of all servlet facades that would otherwise exist at the origin.

Figure 9:
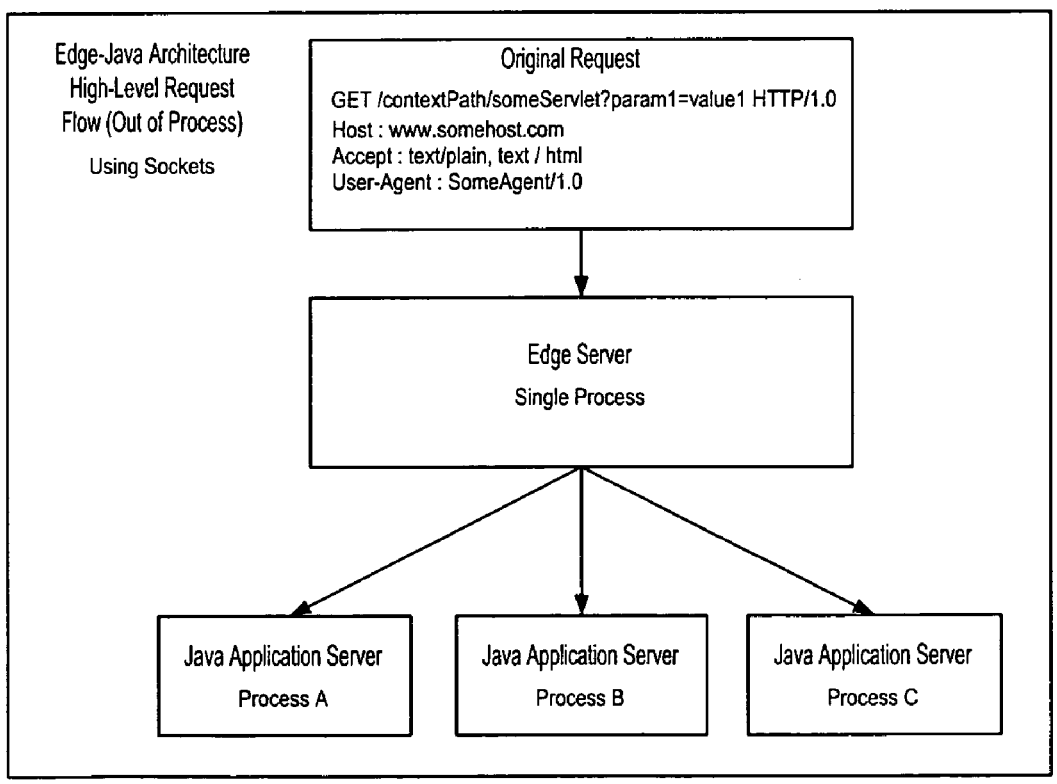
FIG. 9 illustrates an illustrative high level out of process request process flow according to the present invention.

The following describes modifications to a Java application server, specifically its servlet container component, to integrate into the inventive framework. This application server is executed on an edge server, which, as noted above, is a machine running commodity hardware and an operating system. As illustrated in FIG. 9, a preferred architecture is implemented via out of process architecture and comprises an edge server process 900 and multiple Java application server processes 902a–n. An edge node in the content delivery network preferably has a single edge server application that can spawn multiple child processes each containing an application server instance, as was illustrated in FIG. 8. Each child process preferably is configured for a Java Edge Services API (JESAPI), which according to the invention is an integration framework for a Java application server. Generally, JESAPI interfaces the edge server manager process to the application server instances to facilitate various administration functions, namely, the starting, stopping and reloading of WAR and EAR files, the monitoring of the health of the various application server instances, the monitoring of resource usage by the application server instances, and the collecting of data from the instances to facilitate reporting and billing for use of the platform. As illustrated in FIG. 9, an HTTP/HTTPS request first connects to the edge server process 900. The edge server process 900 preferably maps the request to a context path that is preferably specified in a metadata configuration from the customer configuration data. The edge server process 900 then fetches and unpacks an associated web application archive (WAR) on a file system, and installs the archive. Finally, the edge server process modifies the request to be handled by an application server instance and proxies it using sockets. Additionally, the edge server process 900 preferably employs bi-directional communication with each JESAPI application server child instance, transmitting such information as control data and resource usage.

Figure 10:
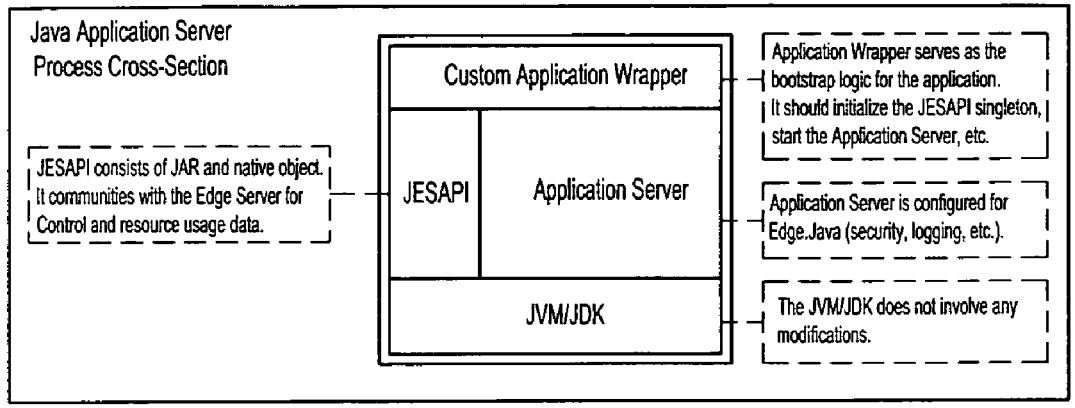
FIG. 10 illustrates an illustrative Java application server process according to an embodiment of the invention.

FIG. 10 illustrates a Java application server instance. The Java application server child process 1000 contains the application server core logic 1002 and is enabled for JESAPI support 1004. An application wrapper 1006 process component is specific to the application server. Its purpose is to integrate and orchestrate the various components of the process. The JVM/JDK 1008 is conventional should not involve any modifications. An external shared object in the JVM intercepts system calls made in the application server process 1002. It monitors resource usage and performs security access checks, as will be described in more detail below. The JESAPI 1004 preferably comprises a set of Java classes and a native library, and it defines the core integration framework for the Java application server process 1002. Although not meant to be limiting, preferably JESAPI relies on the application server process 1002 providing a custom JESAPI implementation singleton object that extends a provided JesapiBase abstract class.

The application wrapper 1006 acts as the bootstrap logic for the application server process 1002. The wrapper 1006 is customized to the application server type and acts as "glue" code connecting all the various components of the process. The wrapper component 1006 provides a JESAPI implementation singleton specific for the application server type, which may vary. In particular, the wrapper 1006 initializes JESAPI 1004, performs any necessary runtime configuration of the application server process 1002, starts the server, and notifies JESAPI when the server is ready to process requests. Because it is the entry point for the application, the wrapper must initialize JESAPI and the application server with the data supplied to it by the edge server process (element 900 in FIG. 9) (in the form of arguments, Java system properties, and the like). The data includes, for example: an application server instance id (used by JESAPI) and the socket port the servlet container must be on for HTTP connections. The application wrapper 1006 preferably configures the edge server to only accept HTTP socket connections. In an illustrative embodiment, the application server process must accept connections bound for the local loopback host and on the port specified by the edge server process. Additionally, the application wrapper provides and registers any handlers with the application server necessary for integration, such as protocol handling and logging. Preferably, the application wrapper receives each application server log event (server and per webapp) and routes it to JESAPI. The log handling API provided by the application server preferably invokes the handler in the same thread that issued the log message, and this thread forwards the message to JESAPI. Because application server log messages are redirected to JESAPI via the application wrapper log handlers, file logging can be disabled in the application server. Other standard data streams from the application server likewise are redirected to JESAPI via the application wrapper.

Preferably, and as described below, the application server process 1002 uses J2EE security policies to restrict the functionality of web applications as well as server code itself. Preferably, the server code is locked down as much as possible to avoid security loopholes. Also, the JESAPI implementation singleton and any classes that are part of the application wrapper preferably have the same protection as server classes. In addition, preferably there are appropriate security restrictions imposed on the entire process (including server and web application logic).

Aside from the features offered by the standard J2EE security permissions, additional restrictions should be imposed for the applications (sometimes referred to as "webapps"). Preferably, web applications are prevented from creating or modifying threads and thread groups. If a web application runs in a non-system thread, the application server process provides a way to address security permissions. A web application also should be allowed to perform JNDI and file read-only operations recursively from its base path (the unpacked WAR file directory root). Preferably, the application server dynamically creates security permissions for the web application at runtime.

Because web applications from different customers preferably can run on the same server, the servlet container preferably is configurable to allow/disallow a web application in one context to access the ServletContext instance of a different context; when servlets attempt to call ServletContext.getContext( ), depending on the configuration for the web application, null may be returned. Preferably, this operation is specified per web application at install time. As an added level of security, an external shared object preferably traps system calls made in the application server process and performs access control checks, as will be described below.

Prior to forwarding any HTTP requests for a particular web application in the application server, the edge server process (element 900 in FIG. 9) is responsible (if necessary) for unpacking the associated WAR to a base directory on the file system and installing the web application components in the application server. The edge server process notifies the application server process to install and invalidate a web application using JESAPI, supplying the web application configuration at runtime. The edge server process is also responsible for managing which contexts are installed in each application server instance. When the edge server process requests the application server to install a web application, the edge server process sends a control request to JESAPI supplying the web application's context path, its base directory path, and a flag that determines if the web application will be able to access other servlet contexts, e.g., using ServletContext.getContext( ). The JESAPI implementation singleton then processes this request, e.g., by invoking the application server's dynamic web application installation mechanism. After the web application gets installed, the edge server process sends requests for it to the application server. When the edge server process is ready to invalidate a particular web application, it stops sending requests to that web application instance and sends a web application uninstallation control request to JESAPI identifying the web application with its context path.

Figure 11:
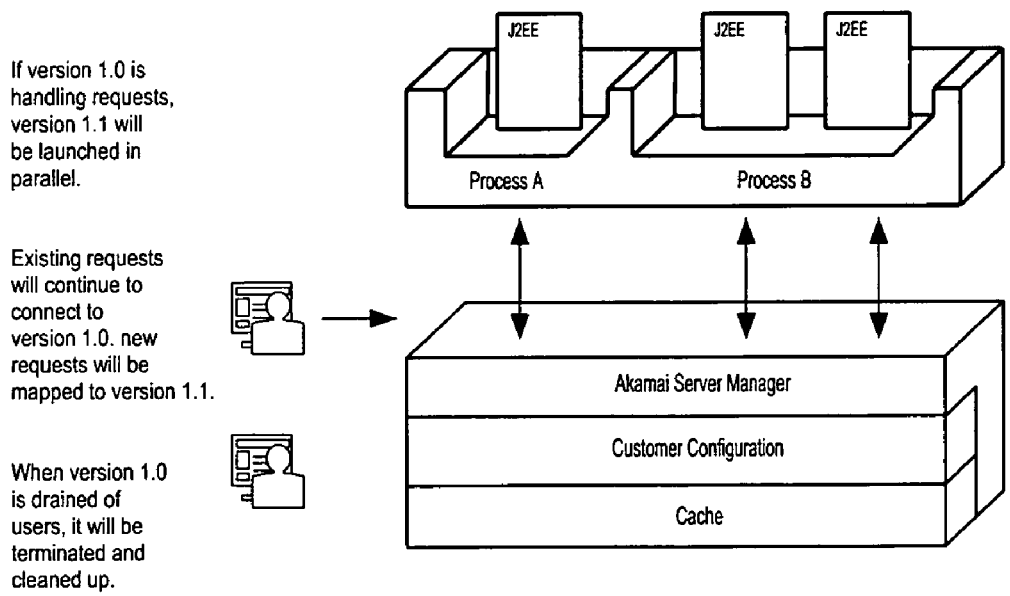
FIG. 11 illustrates how to upgrade an application version in the application server without interrupting the processing of client requests according to a feature of the present invention.

To support web application revisions by hot swapping, the edge server process preferably generates an artificial context path used for web application installation, invalidation, and regular requests in the application server. The context path preferably consists of the context id, a hash of various values that identify the web application instance including the host name, original context path, WAR contents, and revision number. In a preferred publishing model, applications are downloaded and unpacked to the application server as has been described. If a new application version (e.g., Version 1.1) is published while an old application version (e.g., Version 1.0) is active, the new application version is placed in the same process (as the original version), and new requests are directed into the new application version. When the old application version drains of requests, that application version is terminated and appropriate clean-up effected. Preferably, both versions of the same customer application run in the same process, although this is not a requirement. This "hot swapping" technique is illustrated in FIG. 11.

With explicit web application installation, the edge server process thus sends a web application install command to JESAPI and waits for a successful response before forwarding any HTTP requests associated with the web application to the application server. If an explicit install request occurs because the edge server process encounters a request for a not yet installed web application, there is added latency for processing that initial request because of the explicit install roundtrip. As an alternative, an implicit web application install may be performed to minimize the delay incurred by the first request for a web application that is not yet installed. Instead, the edge server process forwards the request to pre-installed JESAPI webapp (at JESAPI startup) in the application server that will both install the specified web application and have that web application process the original request. This is achieved in a single pass between the edge server process and the application server process. To accomplish this, the edge server procsess modifies the original HTTP request to provide the added data to the JESAPI web application so it can install the application and then have it process the request.

Figure 12A:
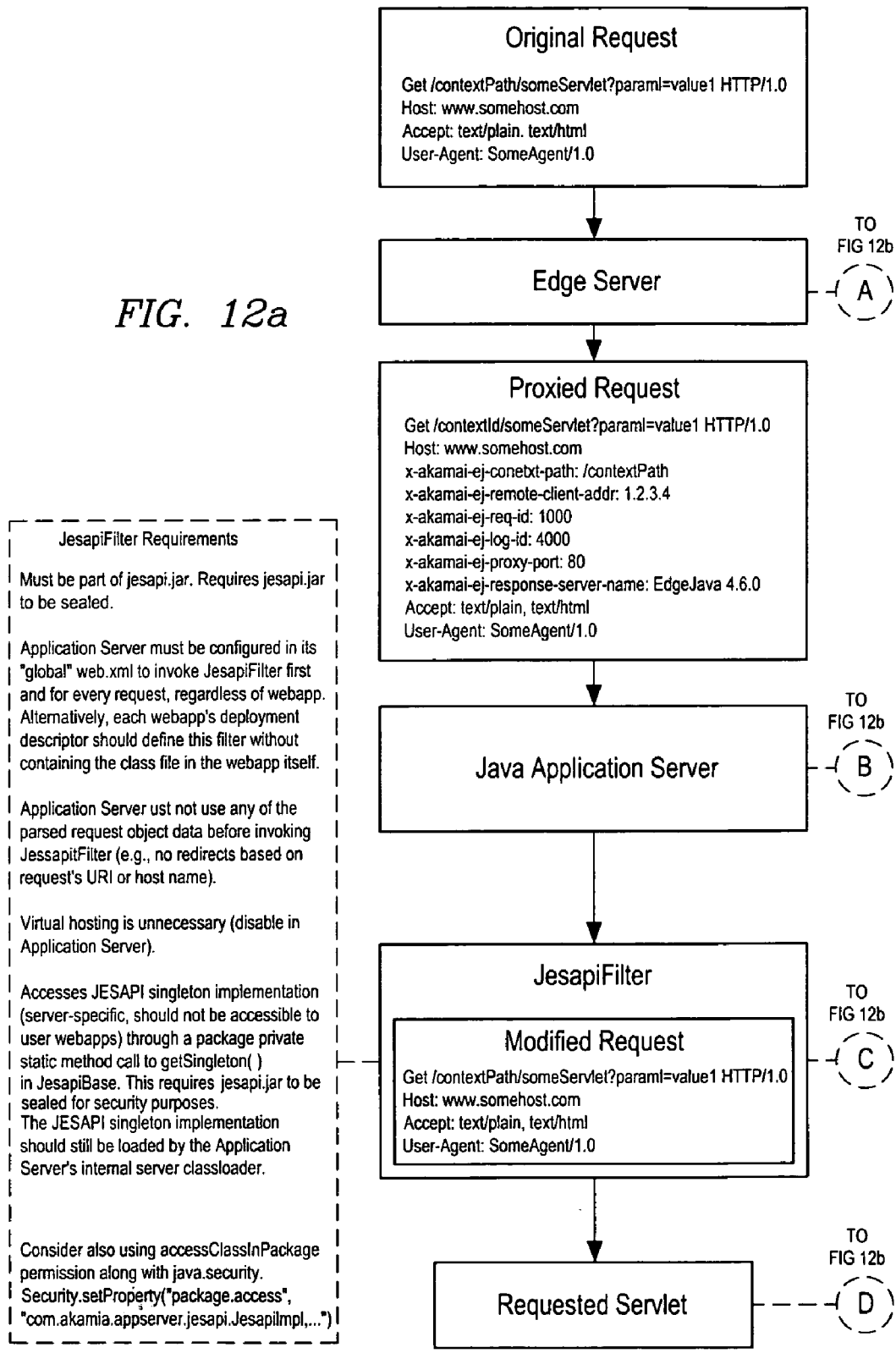
FIG. 12 illustrates a representative request processing flow for the illustrative embodiment of FIG. 9.
Figure 12B:
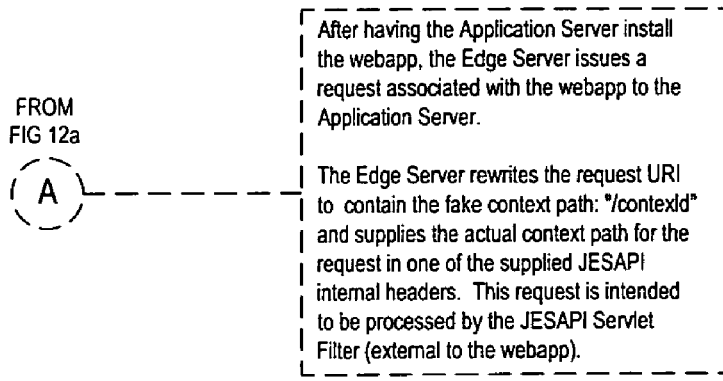
Figure 12B:
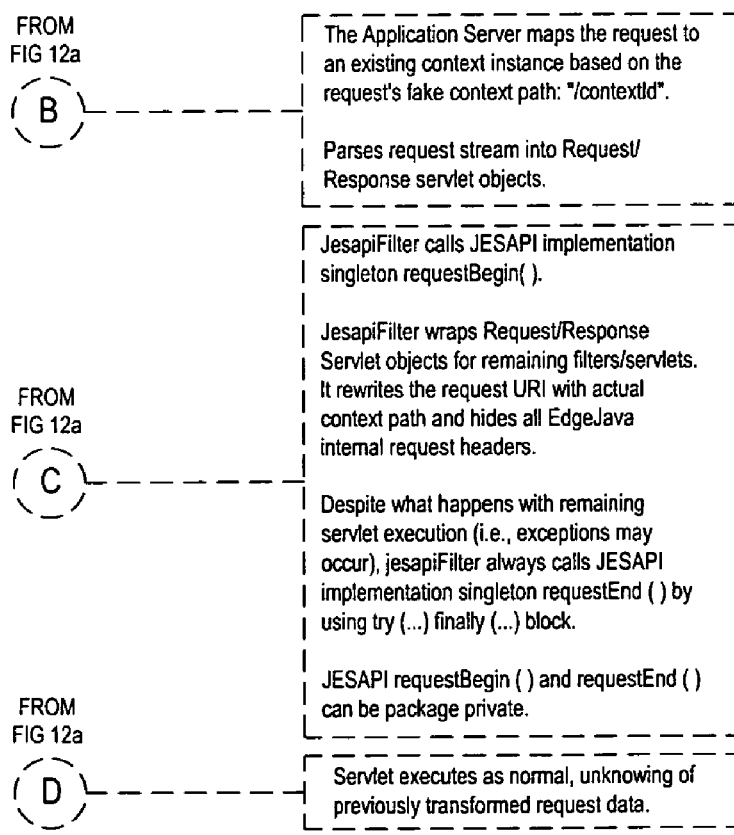

A preferred request processing operation is illustrated in FIG. 12. Preferably, JESAPI requires the application server to assign a distinct thread to process each request. The same thread preferably makes all JESAPI calls for processing that request. After the edge server process receives a request and takes care of installing the associated the webapp as necessary in the application server, but before forwarding it to the installed webapp context, the edge server process modifies the HTTP request to correctly get processed by the application server and a JESAPI Servlet Filter. Specifically, the edge server process alters the request's URI to contain the artificial context path (so the application server can correctly map the request to the previously installed unique context instance). The edge server process also inserts various JESAPI internal headers that provide the JESAPI Servlet Filter with more data about how to handle the request.

Figure 13:
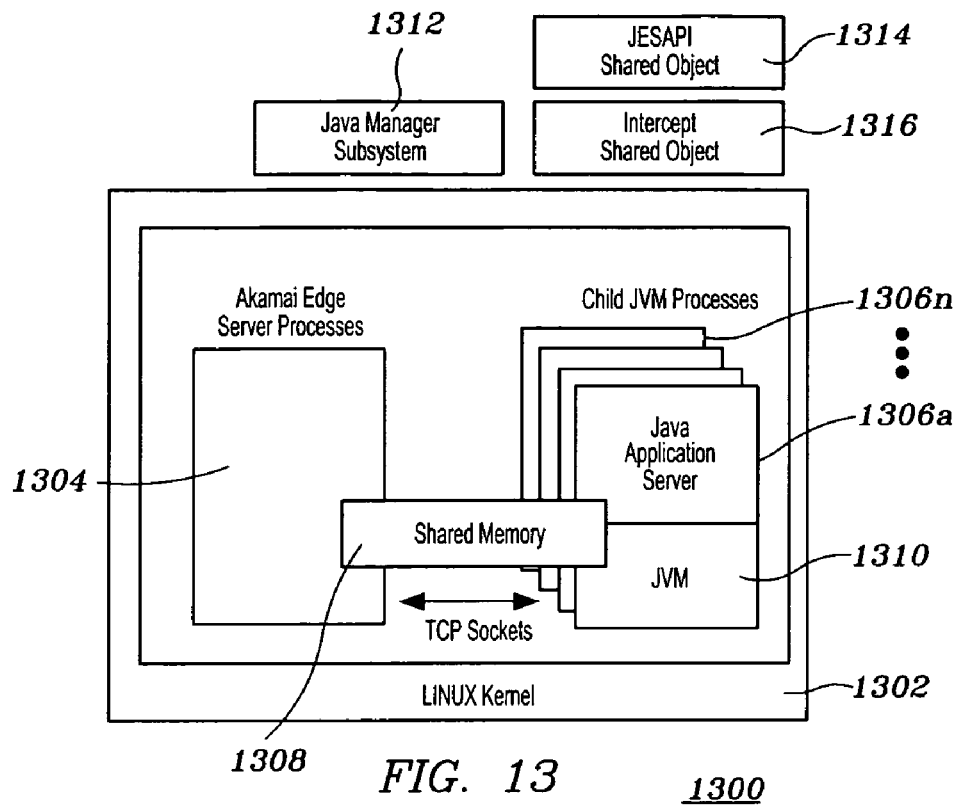
FIG. 13 illustrates a typical edge server concurrently executing multiple Java application server instances for a plurality of CDN customers.

FIG. 13 illustrates a preferred implementation where multiple application server instances are instantiated, preferably one per CDN customer that is using the edge server. Thus, there is preferably one application server per JVM instance per customer, although this is not meant to be limiting. In this example, edge server 1300 is a machine having an operating system 1302 such as the Linux kernel. An edge server manager process 1304 communicate with the child Java application server instances 1306*a–n* preferably via TCP sockets and using a shared memory 1308. Each Java application server instance runs atop its own JVM 1310.

Thus, in this embodiment, there is preferably one application server/JVM instance per customer, and the application server/JVM instances are run out of process from the edge server manager. Preferably, the child application server processes are forked from the edge server manager, after which they are tightly monitored and controlled by a Java manager subsystem 1312. The edge server manager forwards a client request that require application server processing over a local TCP socket to a child application server process, which processes the request, and sends the response on the same connection. In addition, resource utilization load is reported from each application server process, across a shared memory segment 1308, to the Java manager subsystem 1312. The manager subsystem 1312 tightly monitors resource utilization of each child application server process, and it will kill application server processes that over utilize resources.

In particular, resources consumed by each child application server process are monitored, preferably by shared object components that are loaded by each application server process at startup. These include a Java Edge Services API (JESAPI) shared object 1314, and an intercept shared object 1316. The JESAPI shared object 1314 implements specific JESAPI Java native calls, and it is responsible for communicating across the shared-memory segment 1308 with the Java manager subsystem 1312. The intercept shared object 1316 preferably loads various "intercept" system calls such as "open," "close," "gethostbyname" and the like. By intercepting system calls, the manager subsystem 1312 can prevent access to some calls, or make intermediate calculations, or accrue statistics, or the like, before making the "real" system call that the application server intended to make. The Intercept shared object reports any resource utilization to the JESAPI shared object, which then reports it across the shared memory segment to the Java manager subsystem.

The following resources may be monitored for each application server process: memory—the memory used by the JVM's internal Java heap (i.e. the heap in which it does memory management for Java objects allocated by the application server, and the webapps that run in the application server); CPU—the CPU time consumed for each request while it was active inside the application server; disk—the disk operations that the application server performs, including disk operations done as a result of a client request (the JESAPI shared object may also check whether a disk read was from disk or from buffer cache so that flits can be properly attributed to the request); and network—the number of sockets that are opened by each application server process to fetch include URLs. The Java manager subsystem 1312 performs resource management, e.g., through a set of policies based on resource utilization. Thus, for example, the Java manager will kill a child application server process for over-utilization of the following resources in the following ways: memory—if the application server's Java heap uses more memory than a configurable amount set in customer metadata, it will be killed; runaway requests—a runaway request is a request that has been processing for an "unreasonible" amount of time (a configurable number), and if an application server generates a certain configurable number of runaways, it will be killed; open sockets—if an application server reaches a configurable limit of open sockets (for which it has never called close), it will be killed, or the like. This rate limiting of resources ensures that no application server instance can become an exclusive user of the server's resources.

In addition to the above-described resource management, the Java Security Manager framework facilitates sandboxing by imposition of security restrictions to web applications running in each application server process. Preferably, this is achieved through a combination of a security policy file, and a Java Security Manager implementation. The following restrictions preferably are placed on Java web applications in this manner: file system—customer web applications cannot read or write to the file system (although they can read files from within their own WAR file such as static html); socket—customer web applications cannot open Java sockets; threads—customer web applications are not allowed to start/stop/modify Java threads; and code—customer web applications are prevented from reading JESAPI or application server classes. In the case of sockets, preferably a customer webapp can fetch include files through the HttpURLConnection Java class that is intercepted by JESAPI code and that forces the include to go only through the edge server manager process (and monitors the number of open connections). In addition, preferably the framework allows customers to open raw Java sockets. This is because the previously mentioned intercept shared object will intercept all of the socket API calls, and monitor the number of connections made by the application server process. The intercept object will then connect to the edge server manager process using the HTTP CONNECT method, and the edge server manager process will then open a socket to the desired host.

The resource management, sandboxing and security features described above are merely exemplary. Other techniques may be used, for example, resource management by user ID. In such case, after each application server process is launched, a setuid is performed, setting the process to a unique user ID. Once set to this unique UID, other operating system kernel features for resource management can be used. These include total thread limit, file sytem quotas, socket filters, and the like. In addition, this approach enables use of other system calls (e.g., "chroot") to limit the application server process to a subset of the filesystem, outside of which it will not be able to read or write.

One or ordinary skill in the art will appreciate that the JESAPI interface can be designed such as described above to support application servers unchanged. Alternatively, a given application server vendor may modify given application server functionality as appropriate to enable the application server to run on the CDN server provider's edge server platform, in which case certain changes to the servlet container may be necessary for it to be run on the edge server. Thus, for example, where possible, a new subclass of an existing servlet container component should be created (as needed) and then modified to interface to the edge server manager. In either case, preferably the edge server manager interfaces client requests to and from the edge server itself.

Some additional aspects of the edge-enabled application framework are now described below, and several examples are also provided.

Customer Configuration

When an edge server receives a request from a client, preferably it first matches the request with an appropriate customer configuration file. The configuration file may be delivered to the edge servers via any convenient mechanism, such as a CDN metadata transmission system as illustrated in FIG. 1. Of course, any convenient technique for providing the customer configuration data to the edge servers can be used. If the customer configuration associates Java processing with the request, the Java processor is engaged as has been described.

Web Container

As noted above, if the WAR file is already in the edge server, the Java processor uses the applicable servlet or JSP page (for Web tier processing) to generate a response for incoming requests. A standard deployment descriptor preferably is used to properly map the requests to a servlet. If the Java application is not currently on the edge server, it is retrieved from the origin site or from some other source. Because the retrieval process may cause a significant latency, the application may be retrieved asynchronously, while the initial request is tunneled to the origin server simultaneously. The output of the processed request is returned to the user. The executed servlet preferably remains in memory ready for the next user.

Network and Resource Management

Servlets preferably are managed to make sure no process consumes an undue amount of resources. Proper resource monitoring and load balancing assures that no application affects another one running at the same time. The Java application may make requests for content through the network. The requests preferably are made through HTTP and HTTPS protocols. Remote Invocation of other Java resources is also preferably done through HTTP.

The Role of the Origin Site

The origin server may remain an integral part to the edge application, especially when just the Web tier is deployed on the edge network. In addition, because some servlets rely on access to centralized resources, not all requests can be processed by the edge server. In such case, the origin site is responsible for fulfilling the non-edgeable requests, as well as answering any remote calls that might be made by the edge-deployed application.

The following are the typical responsibilites of the origin site in such circumstances: respond to RMI requests from the edge tier, respond to HTTP requests from static and dynamic content, set Host Response Headers (HRH) for controlling edge server behavior as necessary, serve WAR files when requested by the edge servers, and respond to JDBC requests from the edge tier.

Edge-to-Origin Communication

Figure 14:
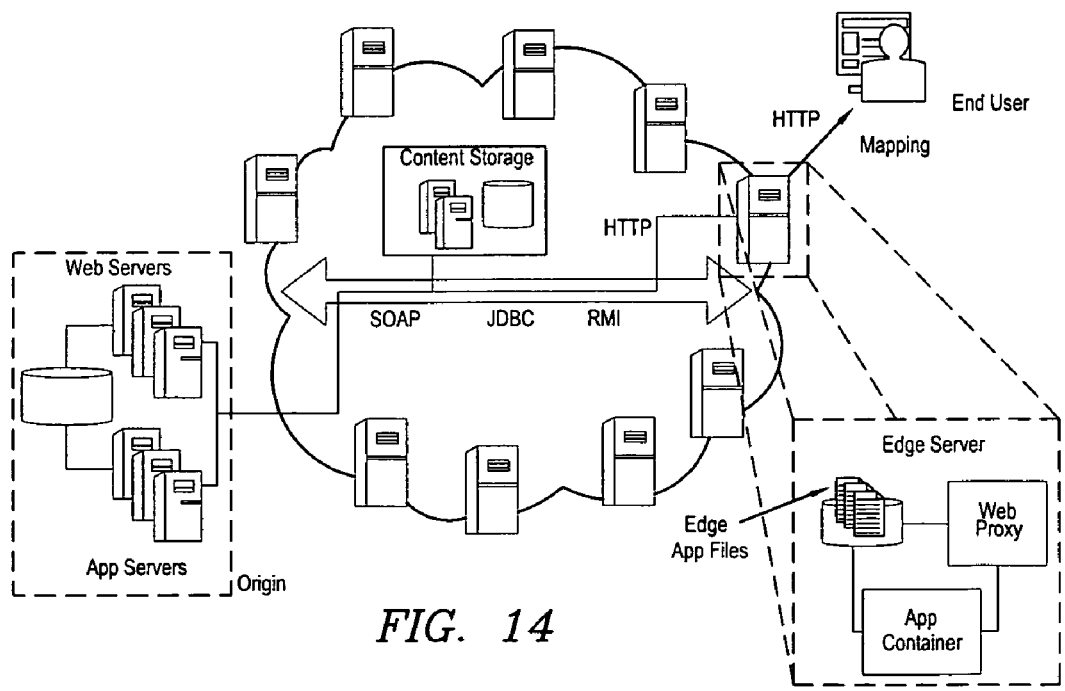
FIG. 14 illustrates a CDN in which an edge server provisioned with an application server container communicates with the origin server and vice versa through one or more communications protocols.

The communication between the servlet on the edge server and the origin site preferably occurs through HTTP or HTTPS protocols as follows: Remote Method Invocation (RMI) communication is tunneled through HTTP; SOAP messages are exchanged over HTTP or HTTPS; JDBC is tunneled over HTTP/HTTPS; responses to relational database queries are encoded in XML (allowing the edge server to cache the results, re-use them with the future requests, and minimizing the inter-tier latency); Servlet control methods (e.g., RequestDispatcher.include( ) and RequestDispatcher.forward( )) are preferably supported regardless of whether the communication is edge-to-origin, or origin-to-edge communication; and custom communication solutions are supported provided messages are transported over HTTP or HTTPS. FIG. 14 is illustrative of these techniques.

To ensure that the application is scalable and benefits from being on the edge, the amount of bytes sent and the number of calls between edge and origin should be minimized. This can be accomplished, for example, through caching of the data on the edge, and through the use of a data-access facade (instead of making multiple calls to a database, in which case an edgeable servlet is used to call a non-edgeable servlet to make the database calls on its behalf).

Application Staging and Deployment

J2EE applications are encouraged to be modular and have a specific structure. The framework obtains the benefits of this decoupled and structured nature of many J2EE applications. The following is a brief summary of different approaches that application architects can use to take advantage of the framework.

Pure Edgeable Servlets

A servlet may be deemed edgeable if the request contains all the information necessary for the creation of the correct response.

Targeted Response

A servlet that utilizes content targeting information (a user's country, state, city, bandwidth, or the like) can also be delivered completely from the edge. An application programming interface (API) may be provided for accessing content targeting information, which an application can use to customize the response. The servlet may use the API to get information about the end-user.

Caching Data as XML

The framework allows applications to easily cache and access data as XML. XML is a convenient, platform agnostic way of generating, storing, and accessing the data. Many databases provide a straightforward way of producing XML from stored records. Caching XML content on the edge reduces the latency associated with retrieving data. Edge servers preferably contain JAXP and XML Query classes, which enable simple parsing and manipulation of the cached XML files. Also, applications can use XSLT processing in the Web applications to transform and present XML data that is retreived from the origin or a cache.

Using XML Web Services

Web Services architecture defines how applications can access data and logic from other applications using standard XML and Internet protocols. Web services provide a simple mechanism that an edge server uses to communicate. Edge servers preferably include the necessary Java classes that enable SOAP communication with the services running on the origin or at third party sites.

Using JDBC from the Edge Server

JDBC calls preferably are tunneled to the origin. To minimize inter-tier latency and reap the benefits of caching, the response to JDBC calls can be cached and shared between different requests.

Using RMI from the Edge Server

RMI can be used for object-to-object communication between the edge server and the origin. Edgeable applications can call object methods located remotely as if the object were local. Method invocations are preferably cached.

Common Use Scenarios

The following common patterns may be used when architecting and developing J2EE applications that run on a distributed Java platform. While many different design patterns are possible, this description is intended to highlight some of the more common patterns, their benefits and the situations when they are most applicable.

Pure Edge Request Processing

Description

Request contains all information necessary for creation of the correct response.

The information contained in the request, such as HTTP header (Cookie, Referer, etc), Query String, or HTTP POST body (form field data, uploaded data, etc), is sufficient for the edge application to produce a response.

Scenarios

HTML form validation—often, a user completed HTML form needs to be verified before processing. Fields such as credit card number, email, or a phone number, should be checked for correctness of format.

Language Customization—Text in the response may be set in the language that the requestor supplied as preferred in the "Accept-Language" header.

Implementation:

Form Validation

In this example, the edgeable servlet uses local class libraries to process the request and serve the response. The servlet may use relevant methods to verify the accuracy of the submitted data before providing the next form screen.

Language Customization

By testing for the presence of the relevant headers, the servlet may respond with an appropriate version of HTML.

Targeted Response

Description

Response is determined by the content targeting information, such as end-user's locality or connectivity.

Scenarios an online delivery site, with a localized front page online portal with local weather information a shopping site, using the market segment data to present a customized front page

Implementation

An application programming interface (API) may be provided for accessing content targeting information, which an application can use to customize the response. The servlet will use the API to get information about the end-user.

Simple Caching of Binary Data

Description

HTTP responses, such as XML data, tunneled JDBC responses, as well as SOAP responses, preferably are cached merely by the act of making a request through the edge server. Caching of HTTP responses is particularly useful when the same resource is being used multiple times by one or more servlets. An API allows for the application to make sure that the content freshness is maintained.

Scenarios user preferences stored in the database on the origin—latency is reduced by providing access to these properties on the edge shopping cart stored in the database on the origin—most of the requests the user makes do not update the contents of the shopping cart. It would be beneficial to keep a cached copy of the shopping cart on the edge and only change its contents when user adds or removes an item

Implementation

User Preferences

User preferences can be retrieved from the origin by making a request to a servlet that retrieves the properties from the database. This file could be a hash, XML, or the like. Subsequent requests for the same URL are served from the cache.

Shopping Cart Object

Alternatively, the edgeable application may use an HTTP SOAP RPC calls to maintain the customer's state with the origin. Origin can provide all of the methods that act on the shopping cart as a web service. The SOAP RPC calls will change the state of the shopping cart when necessary; however, most of the time the shopping cart will only be read, and not modified. All subsequent calls, with the same version number, would return a cached shopping cart.

Because the response has been cached, a subsequent request to the URL, with the same cart_id, will result in an identical response. If a user makes a transaction that changes the contents of the shopping cart, the cart version number is incremented. After the version is modified, future requests will result in a call to the origin. Current cart version number can be stored in a cookie, or some other user-specific properties object.

Caching and Using XML Data

Description

Often, an application needs access to large amounts of data. XML is a convenient, platform agnostic way of generating, storing, and accessing the data. Many databases provide a straightforward way of producing XML from the stored records. Caching XML content on the edge would reduce the latency associated with retrieving data.

Scenarios

Caching catalog data on the edge of the network—for many online stores, updates to the catalog occur infrequently, or it is not crucial to have the updates be put into effect instantly. They would benefit tremendously from database being available to the servlets running close to the user.

Implementation

A most simple scenario would be to simply make an HTTP request for the necessary data (passing the query parameters if necessary). Preferably, the process of requesting the data is enough to cache it. To control freshness of the object, HTTP Headers on the server or the TTL parameter in the request can be used to specify how long data can be cached. Alternatively, a data version number can be used to force a cache-miss when the servlet thinks data may have changed. To access the data, XML parsers can be used. Alternatively, an XML Query implementation can be used to retrieve only the relevant records from the cached XML. When the content provider deems it necessary, the cached catalog can be invalidated. The invalidation can occur programmatically, e.g., by connecting to a managed SOAP invalidation service.

Using JDBC from the Edge Server

Description

Different approaches exist for managing JDBC queries from the edge. One pattern works by caching common SQL query results. Another pattern caches a large data set, but allows the application to read only the relevant data. The use of these patterns reduces the load on the database and minimizes the latency caused by inter-tier communication.

Scenarios
    database driven catalog sites

Implementation

JDBC Implementation

The service provider preferably also provides a JDBC driver implementation, which allows an edge server to communicate with the origin and place queries as if the database was running locally. Preferably, this implementation also caches the results of the queries. Content freshness is maintained by setting an appropriate freshness mechanism on the served results, specifying a time to live (TTL) upon calling of the content, or using a versioning scheme. The JDBC driver preferably makes a SOAP call that allows for the edge server to cache and reuse the response.

Results Sets Implementation

One technique is to use a ResultsSetsObject, to minimize the need for JDBC calls. This approach creates a single large object with the contents of the database. This is done with an expectation that another request will use results from this expanded set. If another servlet makes the same requests, the same object will be returned. Results-set caching classes can be used to traverses and access the retrieved data.

Using Remote Web Services

Description

Leveraging the services provided by third parties is a useful way of leveraging competencies of others, while minimizing the complexity of the application.

Scenarios
    Personalized portal providing stock price tracking capability
    Embedded weather information (locality based on content targeting data)

Implementation

Weather Information
    A standard SOAP client implementation can be used.

Data Synchronization with Cache Coherence Object

Description

In cases where application uses multiple cacheable items that need to be in a consistent state with respect to each other, instead of synchronizing each item with the origin, a single object can act as a coherence mechanism that holds the versions IDs for the content.

Scenario
    An application uses cached images as well as a text file containing description of those images.

Implementation

A Coherence object having given properties is defined. This small object could be either tunneled to the origin, or cached for a relatively short period of time, and then consulted before the content is used. Consequently, data could be cached for a long time, yet the content provider still retains control over content freshness.

Using RMI with Remote Objects

Description

RMI can be used for object-to-object communication between the edge server and the origin. Edgeable applications can call object methods located remotely as if the object were local. This allows the application to leverage the unique capabilities of the origin and the edge as appropriate.

Applicability

This approach is optimal when the object being used is closely tied to the origin, and would not benefit from caching. If the object itself can be cached, and only some methods require use of the origin, consider using the Optimized RMI mechanism described next.

Scenario

A web site providing driving directions requires the use of the origin to calculate the precise path; however, the edgeable servlet would prefer to manipulate a local object so that code would not have to be extensively modified.

Implementation

Standard RMI invocation is used. Once an object is instantiated, it works seamlessly as if it is running locally. This method can potentially increase the inter-tier traffic, causing severe performance degradations. In this example, a CDN service provider-specific JNDI client is used if the CDN does not run the JNDI service; alternatively, a request to a servlet on the origin could be made, which would then result in the passing back of an RMI stub representing the instantiated object.

Optimized RMI/Object Caching

Description

One drawback of using RMI objects is that any data access, or method call, requires communication with the origin. This pattern allows for those methods that can be invoked locally to be invoked in such manner.

Applicability

This pattern applies to situations where the methods of the object that are used frequently do not actually require to be executed on the origin.

Scenarios
    A shopping cart object implementation that services multiple method calls that can be executed on the edge (even if the object itself has to be maintained on the origin).

Implementation

An edgeable object is created by sub-classing the class of the remote object. The methods that need to be executed on the origin are overridden to use the RMI representation of the remote object. After the remote method is executed, the edge object's state is synchronized with the origin. When local methods are executed, they work directly with the local representation of the object. For example, read only methods, such as getter would not cause inter-tier traffic.

This scenario demonstrates that those methods that required remote processing were performed by the origin on an identical object through RMI. Methods that can be executed locally are executed on the cached representation of the object.

The present invention delivers the ability to run Java-based web applications at the edges of the Internet, near the end user, providing several benefits. The web application will be served by as many servers as necessary to maximize the performance. New servers are allocated automatically based on increased traffic, without capital expenditure by an enterprise. Offloading applications from the origin to a distributed network can eliminate single points of failure. In addition, monitoring of edge servers, built-in redundancies and the ability to map users instantly to the optimal servers allows the CDN service provider to bypass network congestions and overcome hardware failures. Offloading application processing from a single origin to to numerous servers at the edge can result in significant performance gains. By mapping each user to an optimal or preferred server, the CDN service provider avoids Internet bottlenecks and can dramatically reduce latency. The ability to allocate servers on demand means applications will never lack processing power or bandwidth. By reducing the number of application servers needed to run at the origin site, the CDN service provider reduces complexity associated with hardware and software maintenance and management.

There is no limitation as to the particular type of application component that may be implemented and deployed as an edge-enabled CDN application. In addition to the examples set forth above, representative applications include, without limitation, product configurators, dealer locators, contest engines, content transcoders, content generators, search aggregators, financial calculators, registration engines, and a myriad of others.

One of ordinary skill will recognize that many variants are within the scope of the present invention. Thus, for example, a particular edge server may execute a first type of application server instance (e.g., Tomcat servlet container) as well as a second, different type of application server instance (e.g., IBM WebSphere Application Server). As already described, multiple instances of a particular application server will typically be used on a given edge server to facilitate use of that server by multiple service provider customers. Of course, other Web containers besides Apache Tomcat can be used to implement the Web tier, and other Enterprise containers besides IBM WebSphere Application Server can be used to implement the Enterprise container. There is no requirement that a particular application have components that execute on both the edge and the origin; indeed, a given application may execute in a standalone manner completely as an edge-enabled application. There also is no requirement that the application components be packaged as WAR or EAR files, as any convenient mechanism may be used to deploy the application components to the edge. There is no requirement that application components be loaded only in response to client requests at a particular edge server. Indeed, in many cases it will be desirable to pre-deploy an application or an application component based on some prediction of expected future need for that application or component, or for purposes of fault tolerance. Thus, a given application or component thereof may be delivered to a particular edge server and initialized and started irrespective of whether an end user request has been received at the server. Also, there is no requirement that application components be fully or partially J2EE-compliant, or even that the subject matter be implemented entirely in Java. Indeed, the present invention is also extensible beyond Java and J2EE. In particular, the inventive concepts may be practiced in any platform-independent application server programming environment (e.g., Microsoft NET, Mod Perl executing in Apache, Zope, or the like) capable of being deployed in a distributed computing environment such as a content delivery network.

The CDN service provider may provide the ability to test and debug the application within an enterprise firewall. A test server may be a CDN edge server simulator that can be used during application development and testing to validate the execution of the application on the platform's runtime environment.

Figure 15:
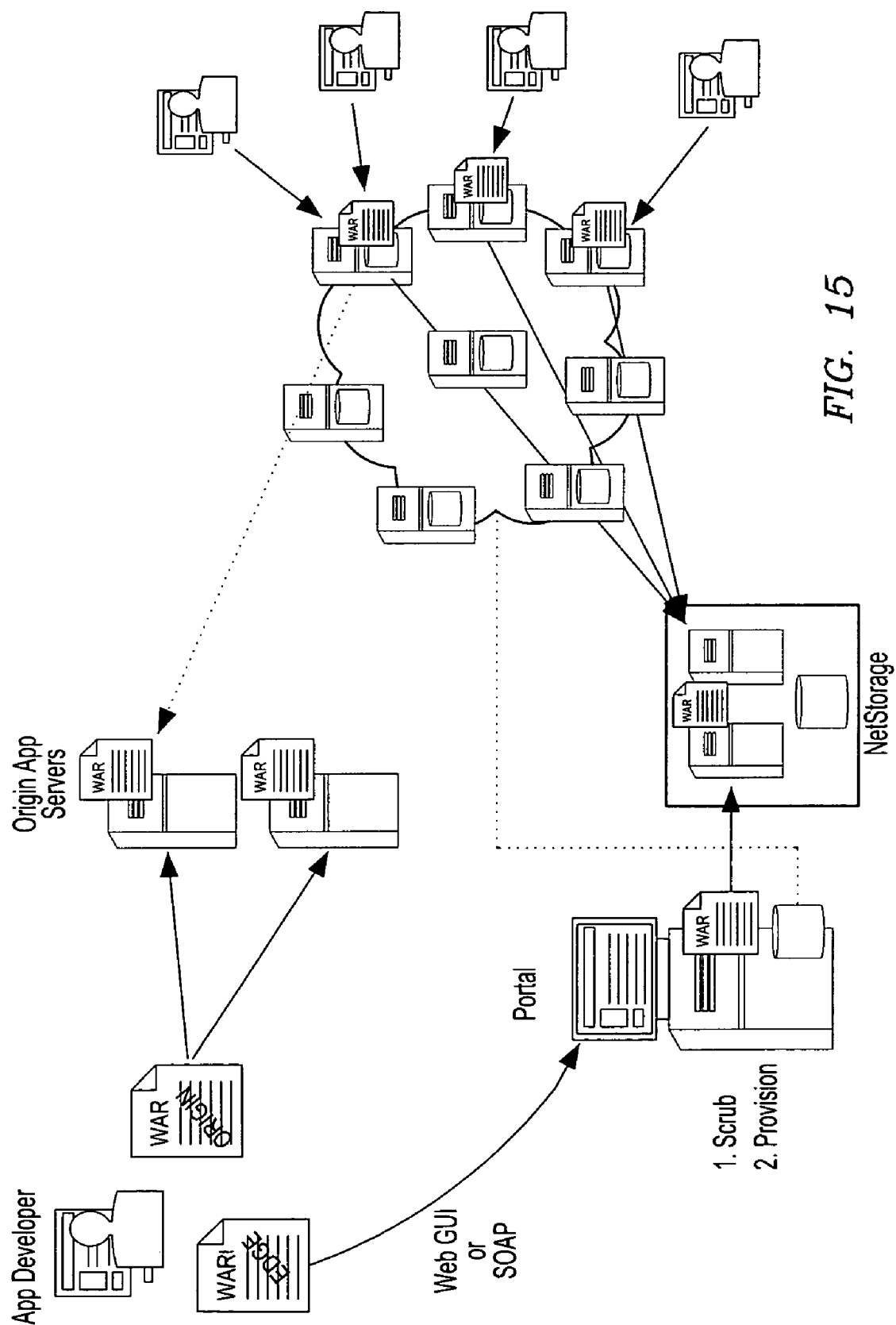
FIG. 15 illustrates a representative application provisioning method and system that takes advantage of the CDN service provider's secure customer portal.

To deploy a prepared edgeable application, the content provider preferably publishes the application (e.g., using FTP) to a CDN staging network. The staging network preferably is a set of staging servers, which may be the CDN edge servers or some other set. This creates a staging environment in which the application can be tested by the enterprise's quality assurance personnel. When tests prove satisfactory, the application is made live, preferably through a secure web interface. FIG. 15 illustrates this process, which takes advantage of a service provider portal. Customers also may upload, deploy and provision applications programmatically. Deployment to the edge preferably occurs automatically. Edge-enabled applications or their components may also be deployed from a CDN content storage network or some other third party server. As already noted, application components also may be pre-fetched to a particular edge server or server region to reduce start-up latency. In a general case, however, an edge application component has not been pre-deployed and an end user has been mapped to a particular edge server. If the end-user request then matches the configuration parameters created during the setup phase, the edge server to which the end user has been mapped will attempt to load the associated Java application. If the Java application is not in cache, it is retrieved from the staging network, or the content storage network, or some other server. Preferably, the application continues to reside within the servlet container for the next request. Unused applications preferably are removed from the Web container but may still be stored in cache. Preferably, if an application has been invalidated, or if the application has not been accessed for an extended period of time, it is removed from the disk cache. To protect the Web application from unauthorized access, preferably only the edge servers are allowed to retrieve the application from the staging network or the other content storage network.

Having described our invention, what we claim is as follows.

The invention claimed is:

1. In an apparatus for use in a content delivery network, the apparatus having a processor, a virtual machine and platform-independent application server code, the improvement comprising:

a set of one or more platform-independent code components each of which are capable of being executed by the platform-independent application server code;

an edge server process for instantiating a set of one application server code instances, each application server code instance capable of executing a given platform-independent code component;

an application programming interface (API) for interfacing the edge server process to each application server code instance and the given platform-independent code component executing thereon;

a wrapper process responsive to a given application processing request for initializing the API and starting an application server code instance to handle the request using the given platform-independent code component;

a monitoring process to monitor the application server code instances and, responsive to said monitoring, to terminate any application server code instance that attempts to over-utilize a given resource, wherein the given resource is one of: an amount of system memory, an amount of processor time consumed, a number of disk operations, and a number of open network sockets; and an enforcing process to enforce one or more security restrictions on each given platform-independent code component executing in a given application server instance, wherein a security restriction is one of: a restriction on file system reading or writing, a restriction on opening or closing a socket, a restriction on starting, stopping or modifying a thread, a restriction on running or loading code associated with another platform-independent code component, a restriction on loading data associated with another platform-independent code component, and a restriction on making native kernel calls.

2. The apparatus as described in claim 1 further including a logging process to log data as the given platform-independent code component is executed by the application server code instance.

3. The apparatus as described in claim 1 wherein a first application server code instance executes a first given platform-independent code component, and a second application server code instance executes a second given platform-independent code component.

4. The apparatus as described in claim 1 wherein a given platform-independent code component is a Web tier component and the application server code instance is a servlet container.

5. The apparatus as described in claim 1 wherein a given platform-independent code component is an Enterprise tier component and the application server code instance is an application, server.

6. An apparatus for use in a content delivery network operated by a service provider on behalf of one or more customer entities, comprising:
a processor;
a Java virtual machine;
a servlet container;
a set or one or more Java code components each of which are capable of being executed by the servlet container;
an edge server process for instantiating a set of servlet container instances, each servlet container instance capable of executing a given Java code component on behalf of a given customer entity;
an application programming interface (API) for interfacing a given application processing request to the servlet container instance and the Java code component;
a wrapper process responsive to a given application processing request for initializing the API and starting an servlet code instance to handle the request using the given Java code component;
a monitoring process to monitor the servlet container instances and, responsive to said monitoring, to terminate any servlet container instance that attempts to over-utilize a given resource, wherein the given resource is one of: an amount of system memory, an amount of processor tune consumed, a number of disk operations, and a number of open network sockets; and
an enforcing process to enforce one or more security, restrictions on each given Java code component executing in a given servlet container instance, wherein a security restriction is one of: a restriction on file system reading or writing, a restriction on opening or closing a socket, a restriction on starting, stopping or modifying a thread, a restriction on running or loading code associated with another Java code component, a restriction on loading data associated with another Java code component, and a restriction on making native kernel calls.

7. The apparatus as described in claim 6 wherein the servlet container is Apache Tomcat.

8. The apparatus as described in claim 6 wherein the given Java code component facilitates execution of a given application.

9. The apparatus as described in claim 8 wherein the given application is selected from a set of applications that include: a product configurator, a dealer locator function, a contest engine, a content transcoder, a content generator, a search aggregator, a financial calculator, and a registration engine.

10. The apparatus as described in claim 1 wherein the platform-independent application server code is an Apache Tomcat servlet container.

11. The apparatus as described in claim 1 wherein the platform-independent application server code is code associated with a NET programming environment.

12. The apparatus as described in claim 1 wherein the monitoring process terminates any application server code instance that attempts to over-utilize a given resource to ensure that no application server code instance can attempt to use the given resource exclusively.

13. The apparatus as described in claim 1 wherein an application server code instance is associated with a virtual machine instance.

14. The apparatus as described in claim 13 wherein a given application server code instance and virtual machine instance are associated with a given content delivery network customer entity exclusively.

15. The apparatus as described in claim 6 wherein the monitoring process terminates any servlet container instance that attempts to over-utilize a given resource to ensure that no servlet container instance can attempt to use the given resource exclusively.

16. The apparatus as described in claim 6 wherein a servlet code instance is associated with a Java virtual machine instance.

17. The apparatus as described in claim 16 wherein a given servlet code instance and Java virtual machine instance are associated with a given customer entity exclusively.

* * * * *